US012780591B2

(12) United States Patent
Zhang et al.

(10) Patent No.: US 12,780,591 B2
(45) Date of Patent: Nov. 3, 2026

(54) ADHESIVE TAPE ATTACHING MECHANISM, ADHESIVE TAPE ATTACHING APPARATUS, AND BATTERY PRODUCTION LINE

(71) Applicant: CONTEMPORARY AMPEREX TECHNOLOGY CO., LIMITED, Ningde (CN)

(72) Inventors: Zhen Zhang, Ningde (CN); Lei Song, Ningde (CN); Shengdong Chen, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/212,710

(22) Filed: May 20, 2025

(65) Prior Publication Data

US 2025/0276869 A1 Sep. 4, 2025

Related U.S. Application Data

(63) Continuation of application No. PCT/CN2023/087268, filed on Apr. 10, 2023.

(30) Foreign Application Priority Data

Feb. 20, 2023 (CN) ......................... 202320249644.9

(51) Int. Cl.

*B65H 37/04* (2006.01)
*H01M 6/00* (2006.01)
*H01M 10/04* (2006.01)

(52) U.S. Cl.

CPC ..... *B65H 37/04* (2013.01); *B65H 2701/1722* (2013.01); *H01M 6/00* (2013.01); *H01M 10/0404* (2013.01); *Y02P 70/50* (2015.11)

(58) Field of Classification Search

USPC ....... 156/265, 264, 256, 527, 523, 522, 521, 156/517, 518, 556, 539, 479, 486, 477.1, (Continued)

(56) References Cited

U.S. PATENT DOCUMENTS 2,937,689 A * 5/1960 Peterson ................. B29C 63/04 72/320
2,980,278 A * 4/1961 Carter ..................... B65C 9/065 156/DIG. 27

(Continued)

FOREIGN PATENT DOCUMENTS

CN 109449498 A 3/2019
CN 109546228 A 3/2019

(Continued)

OTHER PUBLICATIONS

English machine translation of JP 2009158182(A) to Tononishi; Jul. 16, 2009; 14 pages; (Year: 2009).*

(Continued)

*Primary Examiner* — Linda L Gray
(74) *Attorney, Agent, or Firm* — XSENSUS LLP

(57) ABSTRACT

An adhesive tape attaching mechanism includes: an assembly base; a central adhesive tape suction assembly capable of adsorbing and attaching an adhesive tape to a first surface of a workpiece to be adhered; end adhesive tape suction assemblies arranged on two opposite sides of the central adhesive tape suction assembly, where each of the end adhesive tape suction assemblies includes an end driving member and an end adhesive tape suction member in transmission connection with the end driving member; and an end sliding assembly, disposed on the assembly base, where each of the end adhesive tape suction members is configured to be driven by the end driving member connected thereto, guided by the end sliding assembly to slide toward the central adhesive tape suction assembly for clos- (Continued)

ing, and is capable of adsorbing, bending, and attaching the adhesive tape to a second surface and a third surface of the workpiece, respectively.

13 Claims, 5 Drawing Sheets

(58) Field of Classification Search
USPC .......................................... 156/475, 476, 478
See application file for complete search history.

(56) References Cited

U.S. PATENT DOCUMENTS

| | | | | | |
|---|---|---|---|---|---|
| 3,960,641 | A | * | 6/1976 | Pedersen | B31B 70/00 156/522 |
| 4,549,186 | A | * | 10/1985 | Gross | G08B 13/242 343/788 |
| 4,909,891 | A | * | 3/1990 | Sumi | B32B 38/1858 156/497 |
| 2020/0303690 | A1 | * | 9/2020 | Nito | H01M 50/213 |

FOREIGN PATENT DOCUMENTS

| | | | |
|---|---|---|---|
| CN | 210349990 | U | 4/2020 |
| CN | 211076551 | U | 7/2020 |
| CN | 215988885 | U | 3/2022 |
| CN | 217009270 | U | 7/2022 |
| JP | H10-230917 | A | 9/1998 |

OTHER PUBLICATIONS

International Search Report and Written Opinion mailed on Oct. 20, 2023, received for PCT Application PCT/CN2023/087268, filed on Apr. 10, 2023, 10 pages including English Translation.

Notice of Examination Opinion on Patent Application Rapid Pre-examination Request mailed on Feb. 15, 2023, received for CN Pre-examination request No. YS03820232000162, 6 pages including English Translation.

* cited by examiner

ADHESIVE TAPE ATTACHING MECHANISM, ADHESIVE TAPE ATTACHING APPARATUS, AND BATTERY PRODUCTION LINE

CROSS-REFERENCE TO RELATED APPLICATIONS

This application is a bypass continuation of International Application No. PCT/CN2023/087268, filed on Apr. 10, 2023, which refers to Chinese Patent Application No. 202320249644.9, filed on Feb. 20, 2023 and entitled "ADHESIVE TAPE ATTACHING MECHANISM, ADHESIVE TAPE ATTACHING APPARATUS, AND BATTERY PRODUCTION LINE", each are incorporated herein by reference in its entirety.

TECHNICAL FIELD

This application relates to the field of adhesive tape attachment technology, and in particular, to an adhesive tape attaching mechanism, an adhesive tape attaching apparatus, and a battery production line.

BACKGROUND

In the process of industrial production, it is often necessary to attach an adhesive tape to a surface of a product. Traditional adhesive tape attachment methods involve using an adhesive tape suction member to adsorb the adhesive tape and move the same towards the product, with the adhesive tape suction member relying on elastic deformation to clamp the product, so that the adhesive tape can be pressed.

However, the pressing force generated by elastic deformation is unstable, resulting in reduced reliability of the adhesive tape attachment by the adhesive tape attaching mechanism.

SUMMARY

In view of the foregoing problem, this application provides an adhesive tape attaching mechanism, an adhesive tape attaching apparatus, and a battery production line capable of alleviating the problem caused by unstable pressing force resulting from elastic deformation, thereby enhancing the reliability of the adhesive tape attachment.

According to a first aspect, this application provides an adhesive tape attaching mechanism, including:

an assembly base;

a central adhesive tape suction assembly, disposed on the assembly base and capable of adsorbing and attaching an adhesive tape to a first surface of a workpiece to be adhered;

end adhesive tape suction assemblies, disposed on the assembly base and arranged on two opposite sides of the central adhesive tape suction assembly, where each end adhesive tape suction assembly includes an end driving member and an end adhesive tape suction member in transmission connection with the end driving member; and an end sliding assembly, disposed on the assembly base, where each end adhesive tape suction members is configured to be driven by the end driving member connected thereto, guided by the end sliding assembly to slide toward the central adhesive tape suction assembly for closing, and is capable of adsorbing, bending, and attaching the adhesive tape to a second surface and a third surface of the workpiece to be adhered, respectively, with the second surface and the third surface both arranged adjacent to the first surface, and the second surface arranged opposite to the third surface.

In such an adhesive tape attaching mechanism, the force provided by each end driving member to the end adhesive tape suction member connected to the respective end driving member is controllable and exhibits minimal variation over extended use time. Therefore, during the process of pressing the adhesive tape onto the surface of a bare cell, the pressing force applied by each end adhesive tape suction member remains relatively stable. Consequently, the bare cell can be compacted under the action of the adhesive tape, thereby improving its quality. In addition, each end adhesive tape suction member can be folded or unfolded relative to the central adhesive tape suction assembly under the action of the end driving member connected thereto, thereby accommodating products of different thicknesses and offering better adhesive tape attachment compatibility.

In some embodiments of this application, the adhesive tape attaching mechanism further includes the end sliding assembly disposed on the assembly base, and each end adhesive tape suction member is configured to be driven by the end driving member connected thereto, and guided by the end sliding assembly to slide toward the central adhesive tape suction assembly.

In this embodiment, under the guidance of the end sliding assembly, each end adhesive tape suction member can slide stably and smoothly, allowing each end adhesive tape suction member to open or close smoothly.

In some embodiments of this application, each end adhesive tape suction member is configured to have a first limit position when moving toward the central adhesive tape suction assembly, and each end adhesive tape suction member is configured to have a second limit position when moving away from the central adhesive tape suction assembly, with each first limit position located between the second limit position corresponding to the respective end adhesive tape suction member and the central adhesive tape suction assembly; and the adhesive tape attaching mechanism further includes an end limiting assembly, and the end limiting assembly is disposed in at least one first limit position and/or at least one second limit position.

Under the action of the end limiting assembly, at least some of the end adhesive tape suction members can slide relative to the central adhesive tape suction assembly within a suitable range under the influence of the end limiting assembly.

In some embodiments of this application, the central adhesive tape suction assembly includes a support member and a central adhesive tape suction member, and the support member is connected between the central adhesive tape suction member and the assembly base; and a surface of the central adhesive tape suction member facing the workpiece to be adhered is configured as a central adhesive tape suction end face, and a surface of the support member facing the workpiece to be adhered is configured as a support face;

where the central adhesive tape suction end face is closer to the workpiece to be adhered than the support face.

In this embodiment, since the central adhesive tape suction end face is closer to the bare cell compared to the support face, during the process of the central adhesive tape suction member pressing the adhesive tape onto the first surface of the bare cell, the support face does not contact the first surface of the bare cell, thereby reducing the risk of decarbonization of the bare cell caused by the support face pressing against the first surface of the bare cell.

In some embodiments of this application, the support member is slidably disposed on the assembly base, and the support member is configured to drive the central adhesive tape suction member to retract relative to each end adhesive tape suction member under an external force applied to the support face.

In this design, the support member drives the central adhesive tape suction member to retract relative to each end adhesive tape suction member under the external force applied to the support face, the risk of overpressure on the first surface of the bare cell by the central adhesive tape suction member can be reduced; consequently, the probability of decarbonization of the bare cell is also reduced, allowing the bare cell to maintain high quality after the adhesive tape attachment is completed.

In some embodiments of this application, the central adhesive tape suction assembly further includes an elastic member, and the elastic member is in abutment between the assembly base and the central adhesive tape suction member, and is configured to store elastic potential energy for driving the central adhesive tape suction member to reset when the central adhesive tape suction member retracts.

Therefore, by providing the elastic member, the retracted central adhesive tape suction member can automatically reset, reducing the inconvenience of manual operation and enhancing usability.

In some embodiments of this application, the central adhesive tape suction assembly further includes a blocking member, and the blocking member is coupled to the assembly base and configured to prevent the central adhesive tape suction member from sliding along a reset direction of the central adhesive tape suction member after the central adhesive tape suction member is reset.

By providing the blocking member, after the central adhesive tape suction member is reset, the blocking member can prevent the central adhesive tape suction member from continuing to slide along the reset direction, thereby allowing the central adhesive tape suction member to achieve precise resetting, and thus enabling stable and reliable adsorption of the adhesive tape and facilitating its movement.

In some embodiments of this application, the central adhesive tape suction assembly further includes an auxiliary member slidably disposed on the assembly base, the central adhesive tape suction member is disposed on the auxiliary member, and the auxiliary member is capable of moving relative to the assembly base along a retraction direction of the central adhesive tape suction member following the central adhesive tape suction member.

In combination with the auxiliary member and the support member, the central adhesive tape suction member can retract or reset relative to each end adhesive tape suction member stably and smoothly.

In some embodiments of this application, the auxiliary member is a tubular structure, the central adhesive tape suction member has a negative pressure chamber, the central adhesive tape suction end face is provided with an adsorption hole, the negative pressure chamber is in communication between the adsorption hole and an interior of the auxiliary member, and the auxiliary member is configured to output gas from the negative pressure chamber.

In this embodiment, the auxiliary member has a multi-functional capability.

According to a second aspect, this application provides an adhesive tape attaching apparatus, including the adhesive tape attaching mechanism according to any one of the foregoing embodiments.

In some embodiments of this application, the adhesive tape attaching apparatus further includes a carrier body and a translation mechanism, at least one adhesive tape attaching mechanism is provided, the translation mechanism and all adhesive tape attaching mechanisms are disposed on the carrier body, and the translation mechanism is in transmission connection with at least one adhesive tape attaching mechanism and configured to drive the adhesive tape attaching mechanism connected thereto to slide in a direction intersecting both an arrangement direction of the end adhesive tape suction assemblies and an adhesive tape attachment direction of the central adhesive tape suction assembly.

In this embodiment, by providing the translation mechanism, a position of the adhesive tape attaching mechanism in transmission connection with the translation mechanism can be adjusted in a third direction, meeting the requirements for adhesive tape attachment at different positions or for different widths, thus offering higher compatibility.

In some embodiments of this application, the adhesive tape attaching apparatus further includes an adhesive tape attachment limiting mechanism, and the adhesive tape attachment limiting mechanism is disposed on the carrier body and configured to limit a unidirectional or bidirectional sliding distance of at least one adhesive tape attaching mechanism.

Under an action of the adhesive tape attachment limiting mechanism, at least some of the adhesive tape attaching mechanisms can slide within a suitable range.

According to a third aspect, this application provides a battery production line, including the adhesive tape attaching apparatus according to any one of the foregoing embodiments.

The foregoing description is merely an overview of the technical solutions of this application. For a better understanding of the technical means in this application such that they can be implemented according to the content of the specification, and to make the above and other objectives, features, and advantages of this application more obvious and easier to understand, the following describes specific embodiments of this application.

BRIEF DESCRIPTION OF DRAWINGS

Persons of ordinary skill in the art can clearly understand various other advantages and benefits by reading the detailed description of the preferred embodiments below. The accompanying drawings are merely intended to illustrate the preferred embodiments and are not intended to limit this application. Moreover, throughout the accompanying drawings, the same reference signs represent the same components. In the accompanying drawings.

REFERENCE SIGNS

Figure 1:
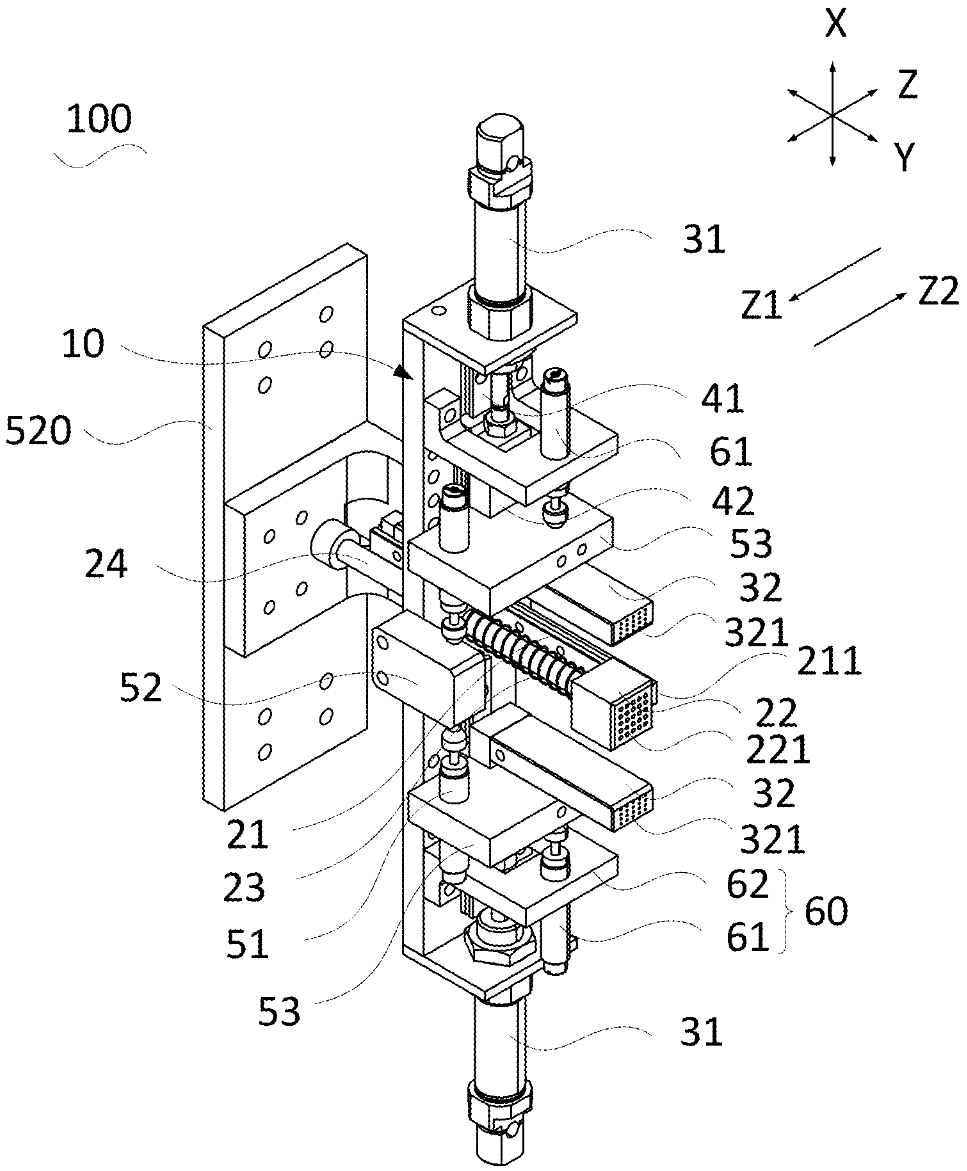
FIG. 1 is a schematic diagram of an overall structure of an adhesive tape attaching mechanism according to one or more embodiments.

- 1000. adhesive tape attaching apparatus; 2000. bare cell; 3000. adhesive tape;
- 100. adhesive tape attaching mechanism; 200. carrier body; 300. translation mechanism; 400. adhesive tape attachment limiting mechanism; 500. translation sliding mechanism;
- 10. assembly base; 20. central adhesive tape suction assembly; 30. end adhesive tape suction assembly; 40. end sliding assembly; 50. first limiting assembly; 60. second limiting assembly;
- 21. support member; 211. support face; 22. central adhesive tape suction member; 221. central adhesive tape suction end face; 23. elastic member; 24. auxiliary member;
- 31. end driving member; 32. end adhesive tape suction member; 321. end adhesive tape suction end surface;
- 41. end slide rail; 42. end slider;
- 51. first limiting member; 52. first limiting seat; 53. first seat body;
- 61. second limiting member; 62. second limiting seat;
- 310. translation driving member; 320. translation mounting seat;
- 410. third limiting assembly; 411. third limiting member; 412. third limiting seat; 420. fourth limiting assembly; 421. fourth limiting member; 422. fourth limiting seat;
- 510. translation slide rail; 520. translation slider;
- 2100. first surface; 2200. second surface; 2300. third surface; 2400. tab;
- 3100. first section; 3200. second section; 3300. middle section;
- X. first direction; Y. second direction; Z. third direction; Z1. first sub-direction; and Z2. second sub-direction.

DESCRIPTION OF EMBODIMENTS

To make the above objectives, features, and advantages of this application more obvious and easier to understand, the following describes the specific embodiments of this application in detail with reference to the accompanying drawings. In the following description, many specific details are set forth to provide a thorough understanding of this application. However, this application can be implemented in many other ways different from those described herein, and those skilled in the art can make similar improvements without violating the connotation of this application. Therefore, this application is not restricted by the specific embodiments disclosed below.

In the description of this application, it should be understood that the orientations or positional relationships indicated by the terms "center", "longitudinal", "transverse", "length", "width", "thickness", "upper", "lower", "front", "rear", "left", "right", "perpendicular", "horizontal", "top", "bottom", "inside", "outside", "clockwise", "counterclockwise", "axial", "radial", "circumferential", and the like are based on the orientations or positional relationships shown in the accompanying drawings. These terms are merely for ease and brevity of description of this application rather than indicating or implying that the apparatuses or elements mentioned must have specific orientations or must be constructed or manipulated according to specific orientations, and therefore shall not be construed as any limitations on this application.

In addition, the terms "first" and "second" are merely for the purpose of description, and shall not be understood as any indication or implication of relative importance or any implicit indication of the number of technical features indicated. Therefore, a feature limited by the term "first", "second", or the like can explicitly or implicitly include one or more such features. In the description of this application, "a plurality of" means at least two, for example, two or three, unless otherwise specifically defined.

In this application, unless otherwise specified and defined explicitly, the terms "mount", "connect", "join", and "fix" should be understood in their general senses. For example, they may refer to a fixed connection, a detachable connection, or an integral connection, may refer to a mechanical connection or an electrical connection, and may refer to a direct connection, an indirect connection via an intermediate medium, an internal communication between two elements, or an interaction between two elements, unless otherwise explicitly defined. Persons of ordinary skill in the art can understand specific meanings of these terms in this application as suitable to specific situations.

In this application, unless otherwise specified and defined explicitly, that a first feature is "above" or "below" a second feature may mean that the first and second features are in direct contact or that the first and second features are in indirect contact via an intermediate medium. Moreover, that the first feature is "above", "over", and "on" the second feature may mean that the first feature is directly above or obliquely above the second feature or simply mean that the first feature has a higher level than the second feature. The first feature being "under", "below", or "beneath" the second feature may mean that the first feature is directly beneath or obliquely beneath the second feature, or simply mean that the first feature is horizontally lower than the second feature.

It should be noted that when an element is referred to as being "fixed to" or "disposed on" another element, it may be directly fixed to the another element, or there may be an element therebetween. When an element is referred to as being "connected to" another element, it may be directly connected to the another element, or there may be an element therebetween. The terms "perpendicular", "horizontal", "upper", "lower", "left", "right", and other similar expressions as used herein are for illustration only instead of indicating the only embodiment.

In the process of industrial production, it is often necessary to attach an adhesive tape to a surface of a product, thereby allowing the adhesion between internal components of the product. Taking a bare cell as an example of the product, after the bare cell (also referred to as an electrode assembly) is formed, an adhesive tape attaching mechanism attaches an adhesive tape to the bare cell, allowing the tape to wrap around a first surface, a second surface, and a third surface of the bare cell. The second surface and the third surface are both arranged adjacent to and connected to the first surface, and the second surface is arranged opposite to the third surface.

When the bare cell is laid flat, the bare cell has a first end face and a second end face spaced apart along a length direction of the bare cell (as indicated by the double-headed arrow M in FIG. 1), a first small side face and a second small side face spaced apart along a width direction of the bare cell (as indicated by the double-headed arrow N in FIG. 1), and a first main side face and a second main side face spaced apart along a thickness direction of the bare cell (as indicated by the double-headed arrow P in FIG. 1).

The first end face refers to a surface of the bare cell where a tab (as shown by the structure labeled 2400 in FIG. 3) protrudes, and the second end face refers to a surface arranged opposite to the first end face. The first main side face, the second main side face, the first small side face, and the second small side face are all connected between the first end face and the second end face, and an area of the first main side face and an area of the second main side face are both greater than an area of the first small side face and greater than an area of the second small side face.

Generally, the first surface is formed by the second end face, while the second surface and the third surface can be formed by the first main side face and the second main side face, respectively, or by the first small side face and the second small side face, respectively, depending on specific requirements. For ease of description, the following explanations take the example when the bare cell is laid flat, the adhesive tape attaching mechanism attaches the adhesive tape to the first surface formed by the second end face, and to the second surface and the third surface formed by the first main side face and the second main side face, respectively.

After the adhesive tape attachment is completed, under the adhesion of the adhesive tape, the bare cell is compacted, resulting in tight attachment between inner and outer layers.

Specifically, the adhesive tape has a first section, a middle section, and a second section arranged sequentially along a length direction of the adhesive tape; the middle section refers to a section where a center point of the adhesive tape is located, and the first section and the second section are distributed on two sides of the middle section and are both connected to the middle section.

Before adhesive tape attachment, the adhesive tape attaching mechanism slides toward the workpiece to be adhered under the action of an external driving structure. During this process, the central adhesive tape suction member adsorbs the middle section of the adhesive tape, an end adhesive tape suction member on one side of the central adhesive tape suction member adsorbs the first section of the adhesive tape, and an end adhesive tape suction member on another side of the central adhesive tape suction member adsorbs the second section of the adhesive tape and drives the adhesive tape to slide. At this point, the adhesive tape is a strip structure extending in a straight line.

After the central adhesive tape suction member attaches the middle section of the adhesive tape to the first surface of the workpiece to be adhered, under continued driving by the external driving structure, the end adhesive tape suction members on two sides of the central adhesive tape suction member continue to slide; the end adhesive tape suction member on one side of the central adhesive tape suction member bends the first section of the adhesive tape relative to the middle section and attaches the first section to the second surface, and the end adhesive tape suction member on another side of the central adhesive tape suction member bends the second section of the adhesive tape relative to the middle section and attaches the second section to the third surface, thereby achieving U-shaped adhesive tape attachment (that is, a U-shaped adhesive tape formed by the adhesive tape extending in a straight line after adhesive tape attachment).

In a traditional adhesive tape attaching mechanism, the end adhesive tape suction members on two sides of the central adhesive tape suction member are connected by an elastic component. The force by which the end adhesive tape suction member on one side of the central adhesive tape suction member attaches the first section of the adhesive tape to the second surface, and the force by which the end adhesive tape suction member on another side of the central adhesive tape suction member bends and attaches the second section of the adhesive tape to the third surface, are both generated by deformation of the elastic component. Uncontrollable deformation of the elastic component may cause the end adhesive tape suction members on two sides of the central adhesive tape suction member to shake and collide with the second surface and the third surface of the bare cell during the adhesive tape attachment process, resulting in damage to the bare cell and reduced quality of the bare cell. Moreover, after a period of use, the elastic component undergoes irreversible deformation, leading to a reduction in the force which the elastic component tightens the end adhesive tape suction members on two sides of the central adhesive tape suction member. In such cases, the end adhesive tape suction members on two sides of the central adhesive tape suction member cannot clamp the bare cell tightly, and the first section and the second section of the adhesive tape cannot adhere closely to the bare cell. Consequently, the bare cell remains relatively loose after adhesive tape attachment, with large gaps between inner and outer layers, further reducing quality.

Based on the foregoing issues, in an adhesive tape attaching mechanism according to one or more embodiments of this application, each end adhesive tape suction member slides under the driving action of the end driving member corresponding to the respective end adhesive tape suction member, enabling the end adhesive tape suction members on two sides of the central adhesive tape suction member to cooperate in clamping the bare cell.

In such an adhesive tape attaching mechanism, the force provided by the end driving member to the end adhesive tape suction member connected to the respective end driving member is controllable and exhibits minimal variation over extended use time. Therefore, each end adhesive tape suction member can stably apply pressure to press the first section and the second section onto the second surface and the third surface of the bare cell, respectively. As a result, the bare cell after adhesive tape attachment can be compacted under the action of the entire adhesive tape, improving the quality of the bare cell.

Figure 2:
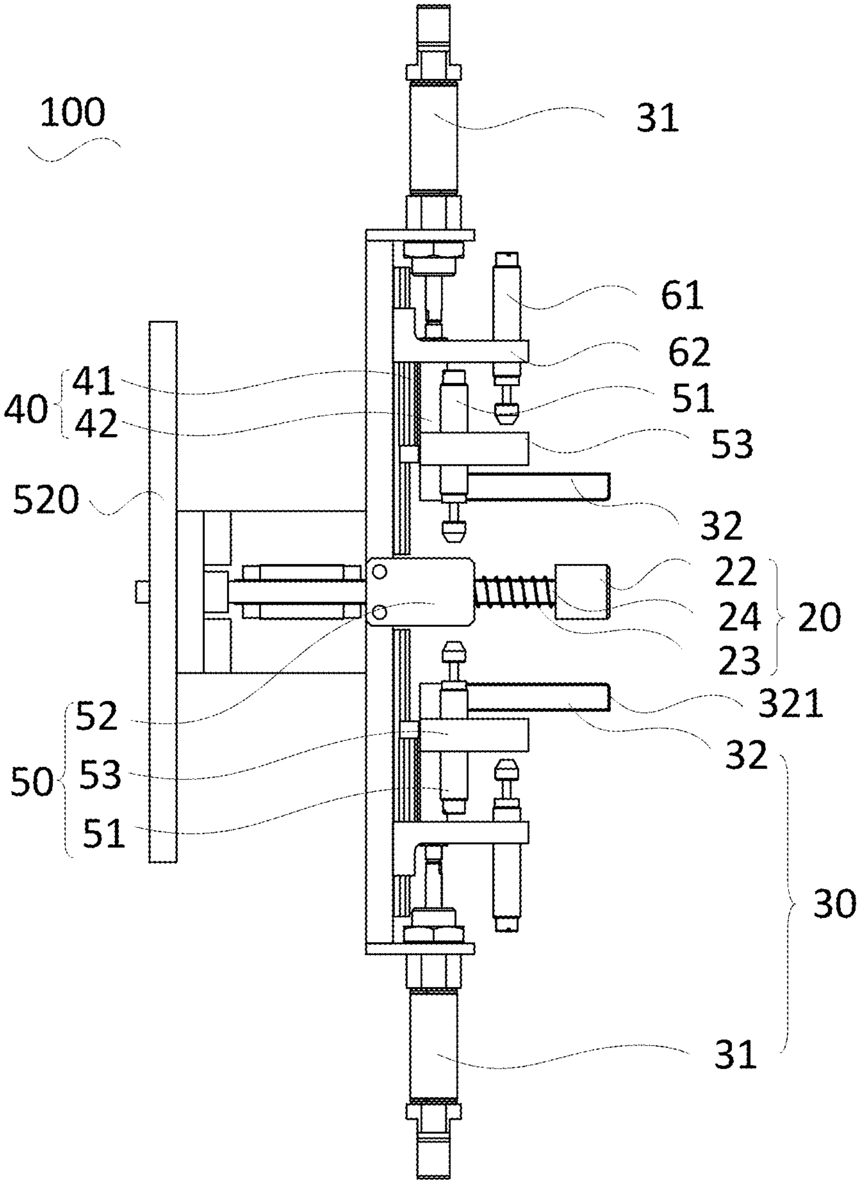
FIG. 2 is a left view of the adhesive tape attaching mechanism shown in FIG. 1.
Figure 3:
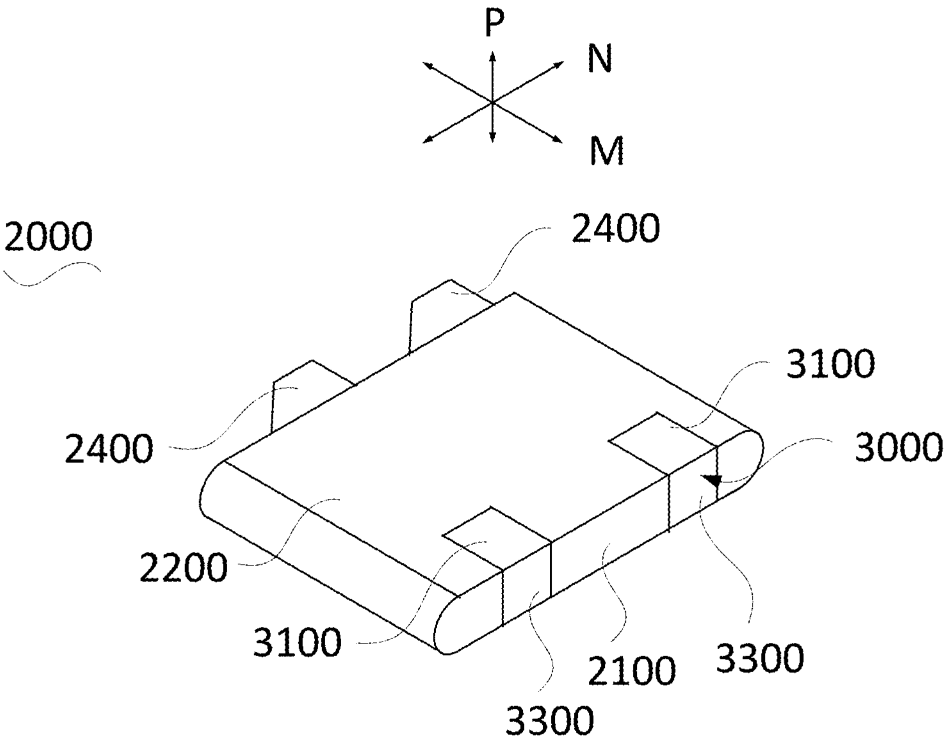
FIG. 3 is a schematic structural diagram after an adhesive tape is attached to a bare cell according to one or more embodiments.
Figure 4:
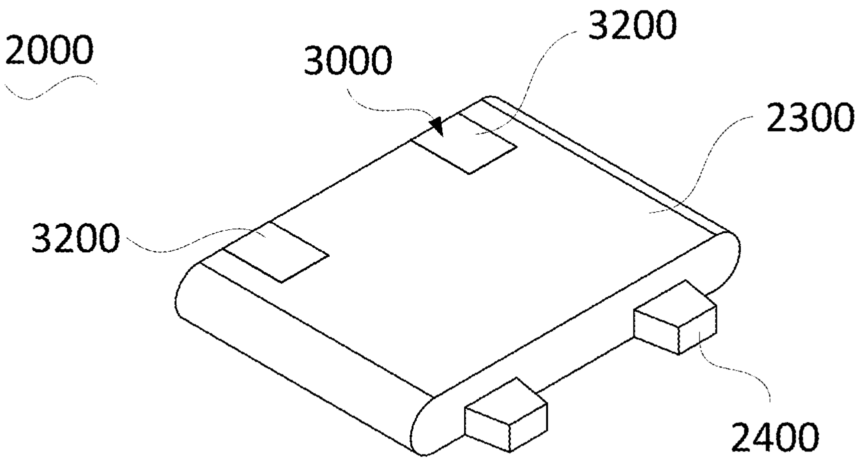
FIG. 4 is a schematic structural diagram from another perspective after the adhesive tape is attached to the bare cell as shown in FIG. 3.

Refer to FIG. 1, FIG. 2, FIG. 3, and FIG. 4. FIG. 1 is a schematic diagram of an overall structure of an adhesive tape attaching mechanism according to one or more embodiments, FIG. 2 is a left view of the adhesive tape attaching mechanism according to one or more embodiments, FIG. 3 is a schematic structural diagram after an adhesive tape is attached to a bare cell according to one or more embodiments, and FIG. 4 is a schematic structural diagram from another perspective after the adhesive tape is attached to the bare cell according to one or more embodiments.

According to a first aspect, one or more embodiments of this application provide an adhesive tape attaching mechanism 100, and the adhesive tape attaching mechanism 100 is configured to attach adhesive tape attachment to a workpiece to be adhered. The workpiece to be adhered refers to the foregoing product. The workpiece to be adhered may be, but is not limited to, a bare cell 2000 on a battery production line, or other objects. For ease of description, the following embodiments take the workpiece to be adhered as the bare cell 2000 on a battery production line as an example.

The adhesive tape attaching mechanism 100 includes an assembly base 10, a central adhesive tape suction assembly 20, end adhesive tape suction assemblies 30, and an end sliding assembly 40. The central adhesive tape suction assembly 20 is disposed on the assembly base 10 and capable of adsorbing and attaching an adhesive tape 3000 to a first surface 2100 of the bare cell 2000. The end adhesive tape suction assemblies 30 are disposed on the assembly base 10 and arranged on two opposite sides of the central adhesive tape suction assembly 20; each end adhesive tape suction assembly 30 includes an end driving member 31 and an end adhesive tape suction member 32 in transmission connection with the end driving member 31. The end sliding assembly 40 is disposed on the assembly base 10. Each end adhesive tape suction member 32 is configured to be driven by the end driving member 31 connected thereto, guided by the end sliding assembly 40 to slide toward the central adhesive tape suction assembly 20 for closing, and is capable of adsorbing, bending, and attaching the adhesive tape 3000 to a second surface 2200 and a third surface 2300 of the bare cell 2000, respectively, with the second surface 2200 and the third surface 2300 both arranged adjacent to the first surface 2100, and the second surface 2200 arranged opposite to the third surface 2300.

The end adhesive tape suction assemblies 30 are arranged on two opposite sides of the central adhesive tape suction assembly 20 along a first direction X. For ease of description, the following embodiments take a vertical direction in the state of the adhesive tape attaching mechanism 100 shown in FIG. 1 as the first direction X as an example.

The adhesive tape attaching mechanism 100 and the bare cell 2000 are arranged along a second direction Y intersecting the first direction X, and the adhesive tape attaching mechanism 100 reciprocates along the second direction Y under the action of an external driving structure, enabling the adhesive tape attaching mechanism 100 to perform adhesive tape attachment operations cyclically.

An angle between the first direction X and the second direction Y can be set as an acute angle, a right angle, or an obtuse angle depending on requirements. The following embodiments take the first direction X and the second direction Y being perpendicular to each other, with the second direction Y being a horizontal direction in the state of the adhesive tape attaching mechanism 100 shown in FIG. 1, as an example.

During an actual adhesive tape attachment process, the first direction X can be arranged parallel to a width direction of the bare cell 2000 when the bare cell 2000 is laid flat, or parallel to a thickness direction of the bare cell 2000 when the bare cell 2000 is laid flat, depending on specific requirements.

When the first direction X is arranged parallel to the width direction of the bare cell 2000 when the bare cell 2000 is laid flat, the central adhesive tape suction assembly 20 attaches a middle section 3300 of the adhesive tape 3000 to the second end face of the bare cell 2000, the end adhesive tape suction member 32 on one side of the central adhesive tape suction assembly 20 attaches a first section 3100 of the adhesive tape 3000 to the first small side face of the bare cell 2000, and the end adhesive tape suction member 32 on another side of the central adhesive tape suction assembly 20 attaches a second section 3200 of the adhesive tape 3000 to the second small side face of the bare cell 2000, achieving U-shaped adhesive tape attachment.

When the first direction X is arranged parallel to the thickness direction of the bare cell 2000 when the bare cell 2000 is laid flat, the central adhesive tape suction assembly 20 attaches the middle section 3300 of the adhesive tape 3000 to the second end face of the bare cell 2000, the end adhesive tape suction member 32 on one side of the central adhesive tape suction assembly 20 attaches the first section 3100 of the adhesive tape 3000 to the first main side face of the bare cell 2000, and the end adhesive tape suction member 32 on another side of the central adhesive tape suction assembly 20 attaches the second section 3200 of the adhesive tape 3000 to the second main side face of the bare cell 2000, achieving U-shaped adhesive tape attachment.

For ease of description, the following embodiments take the first direction X being parallel to the thickness direction of the bare cell 2000 when the bare cell 2000 is laid flat as an example.

Two end adhesive tape suction assemblies 30 are provided and disposed on two opposite sides of the central adhesive tape suction assembly 20 along the first direction X. The end adhesive tape suction member 32 in each end adhesive tape suction assembly 30 can be an integral structure or a segmented structure. For example, taking each end adhesive tape suction member 32 being an integral structure as an example, each end adhesive tape suction member 32 has an end adhesive tape suction end surface 321, and an area of the end adhesive tape suction end surface 321 of each end adhesive tape suction member 32 is the same or similar. Taking one of the end adhesive tape suction members 32 being an integral structure and another of the end adhesive tape suction members 32 being a segmented structure as an example, the another end adhesive tape suction member 32 can consist of multiple end adhesive tape suction submembers, each of the end adhesive tape suction sub-members has an end adhesive tape suction sub-member end face, and a total area of the end adhesive tape suction sub-member end faces of the end adhesive tape suction sub-members is the same or similar to an area of the end adhesive tape suction end surface 321 of the one of the end adhesive tape suction members 32.

The end adhesive tape suction end surface 321 refers to a surface of the end adhesive tape suction member 32 facing the bare cell 2000, and the end adhesive tape suction sub-member end face refers to a surface of the end adhesive tape suction sub-member facing the bare cell 2000; and both the end adhesive tape suction end surface 321 and the end adhesive tape suction sub-member end face can be used for adhesive tape suction.

For ease of description, the following embodiments take each end adhesive tape suction member 32 being an integral structure as an example.

Each end adhesive tape suction member 32, driven by the end driving member 31 connected thereto, slides relative to the central adhesive tape suction assembly 20 guided by the end sliding assembly 40, enabling each end adhesive tape suction member 32 to open or close relative to the central adhesive tape suction assembly 20. Specifically, when each end adhesive tape suction member 32 slides toward the central adhesive tape suction assembly 20, each end adhesive tape suction member 32 closes relative to the central adhesive tape suction assembly 20; and when each end adhesive tape suction member 32 slides away from the central adhesive tape suction assembly 20, each end adhesive tape suction member 32 opens relative to the central adhesive tape suction assembly 20.

The end sliding assembly 40 can take various forms. For example, the end sliding assembly 40 can be a guide structure with a sliding groove, where the sliding groove extends along the first direction X. Each end adhesive tape suction member 32 is slidably arranged within the sliding groove and slides along the first direction X under the guidance of the sliding groove.

Alternatively, the end sliding assembly 40 includes an end slide rail 41 and two end sliders 42 disposed on the end slide rail 41, where the two end sliders 42 are both disposed on the end slide rail 41, and the two end sliders 42 are in a one-to-one correspondence with the two end adhesive tape suction members 32 in the two end adhesive tape suction assemblies 30. Each end adhesive tape suction member 32 is disposed on the end slider 42 corresponding thereto, and the two end sliders 42 are also in a one-to-one correspondence with the two end driving members 31 in the two end adhesive tape suction assemblies 30. Under the action of each end driving member 31, each end slide rail 41 can drive the end adhesive tape suction member 32 disposed on the respective end slide rail to slide.

In this embodiment, under the guidance of the end sliding assembly 40, each end adhesive tape suction member 32 can slide stably and smoothly, enabling each end adhesive tape suction member 32 to open or close smoothly.

When closing, the end adhesive tape suction members 32 on two sides of the central adhesive tape suction assembly 20 both adsorb the adhesive tape 3000 and can bend and attach the adhesive tape 3000 to the second surface 2200 and the third surface 2300 of the bare cell 2000, respectively. When opening, the end adhesive tape suction members 32 on two sides of the central adhesive tape suction assembly 20 release the bare cell 2000 after adhesive tape attachment, facilitating the transportation of the bare cell 2000 to a next process.

The following provides a detailed description of a specific adhesive tape attachment process of the adhesive tape attaching mechanism 100.

Before the adhesive tape attaching mechanism 100 absorbs the adhesive tape 3000, the adhesive tape attaching mechanism 100 is spaced apart from the bare cell 2000 in the second direction Y. Each end adhesive tape suction member 32, under the action of the end driving member 31 connected thereto, is guided by the end sliding assembly 40 to slide toward the central adhesive tape suction assembly 20 for closing, such that a distance between the end adhesive tape suction members 32 on two sides of the central adhesive tape suction assembly 20 matches a thickness of the bare cell 2000. At this point, the end adhesive tape suction end surface 321 of each end adhesive tape suction member 32 is coplanar with a central adhesive tape suction end face 221 of the central adhesive tape suction assembly 20, facilitating the adsorption of the adhesive tape 3000 extending in a straight line.

Then, the central adhesive tape suction assembly 20 adsorbs the middle section 3300 of the adhesive tape 3000, the end adhesive tape suction members 32 on two sides of the central adhesive tape suction assembly 20 adsorbs the first section 3100 and the second section 3200 of the adhesive tape 3000, respectively, and under the action of the external driving structure, the adhesive tape attaching mechanism 100 drives the adhesive tape 3000 to slide along the second direction Y toward the bare cell 2000 until the middle section 3300 of the adhesive tape 3000 abuts against the first surface 2100 of the bare cell 2000.

Next, the external driving structure continues to push the adhesive tape attaching mechanism 100 forward, and the central adhesive tape suction assembly 20 attaches the adhesive tape 3000 to the first surface 2100. Simultaneously, the end adhesive tape suction member 32 on one side of the central adhesive tape suction assembly 20 drives the first section 3100 of the adhesive tape 3000 to bend relative to the middle section 3300 and attaches the first section 3100 to the second surface 2200, and the end adhesive tape suction member 32 on another side of the central adhesive tape suction assembly 20 drives the second section 3200 of the adhesive tape 3000 to bend relative to the middle section 3300 and attaches the second section 3200 to the third surface 2300, achieving U-shaped adhesive tape attachment.

Thereafter, each end adhesive tape suction member 32, under the action of the end driving member 31 connected thereto, is guided by the end sliding assembly 40 to slide toward the central adhesive tape suction assembly 20 for opening, releasing the bare cell 2000. Finally, the external driving structure drives the adhesive tape attaching mechanism 100 to move along the second direction Y away from the workpiece to be adhered after adhesive tape attachment, preparing for a next adhesive tape suction attachment.

In such an adhesive tape attaching mechanism 100, the force provided by each end driving member 31 to the end adhesive tape suction member 32 connected thereto is controllable and exhibits minimal variation over extended use time. Therefore, during the process of pressing the adhesive tape 3000 onto the surface of the bare cell 2000, the pressing force applied by each end adhesive tape suction member 32 remains relatively stable. Consequently, the bare cell 2000 can be compacted under the action of the adhesive tape 3000, improving quality. Furthermore, each end adhesive tape suction member 32 can close or open relative to the central adhesive tape suction assembly 20 under the action of the end driving member 31 connected thereto, accommodating products of different thicknesses and offering better adhesive tape attachment compatibility.

Still referring to FIG. 1 and FIG. 2, in one or more embodiments of this application, each end adhesive tape suction member 32 is configured to have a first limit position when moving toward the central adhesive tape suction assembly 20, and each end adhesive tape suction member 32 is configured to have a second limit position when moving away from the central adhesive tape suction assembly 20, with each first limit position located between the second limit position corresponding thereto and the central adhesive tape suction assembly 20; and the adhesive tape attaching mechanism 100 further includes an end limiting assembly, and the end limiting assembly is disposed in at least one first limit position and/or at least one second limit position.

Specifically, each first limit position and each second limit position are disposed on the assembly base 10. The first limit position can be understood as a position closest to the central adhesive tape suction assembly 20 that the end adhesive tape suction member 32 can reach when sliding toward the central adhesive tape suction assembly 20. The second limit position can be understood as a position farthest from the central adhesive tape suction assembly 20 that the end adhesive tape suction member 32 can reach when sliding away from the central adhesive tape suction assembly 20. The first limit positions of the end adhesive tape suction members 32 on two sides of the central adhesive tape suction assembly 20 are different, and the second limit positions of the end adhesive tape suction members 32 on two sides of the central adhesive tape suction assembly 20 are also different.

When the end limiting assembly is located at any one first limit position, the end adhesive tape suction member 32 having this first limit position abuts against the end limiting assembly and stops sliding when sliding toward the central adhesive tape suction assembly 20 to this position. When the end limiting assembly is located at any one second limit position, the end adhesive tape suction member 32 having this second limit position abuts against the end limiting assembly and stops sliding when sliding away from the central adhesive tape suction assembly 20 to this position.

The end limiting assembly being disposed in at least one first limit position and/or at least one second limit position includes various embodiments. For example, the end limiting assembly is disposed only at the first limit position or the second limit position of one of the end adhesive tape suction members 32, the end limiting assembly is simultaneously disposed at the first limit position and the second limit position of one of the end adhesive tape suction members 32. Alternatively, the end limiting assembly is simultaneously disposed at the first limit position of each end adhesive tape suction member 32 and the second limit position of each end adhesive tape suction member 32, and the like. The positions where the end limiting assembly is disposed can be set according to requirements.

A portion of the end limiting assembly located at the first limit position is defined as a first limiting assembly 50, and a portion of the end limiting assembly located at the second limit position is defined as a second limiting assembly 60. When the end limiting assembly is disposed only at one first limit position, the end limiting assembly consists only of one first limiting assembly 50. When the end limiting assembly is disposed only at one first limit position and one second limit position, the end limiting assembly consists of one first limiting assembly 50 and one second limiting assembly 60. When the end limiting assembly is disposed at each first limit position and each second limit position, the end limiting assembly consists of each first limiting assembly 50 located at each first limit position and each second limiting assembly 60 located at each second limit position.

The following embodiments take the end limiting assembly consisting of each first limiting assembly 50 located at each first limit position and each second limiting assembly 60 located at each second limit position as an example.

The first limiting assembly 50 may include a first limiting member 51 and a first limiting seat 52, and the first limiting seat 52 is connected between the first limiting member 51 and the assembly base 10. Alternatively, the first limiting assembly 50 may only include the first limiting member 51, and the first limiting member 51 is directly mounted on the assembly base 10. Alternatively, the first limiting assembly 50 may include the first limiting member 51, a first mounting seat, and a first seat body 53; the first limiting member 51 is mounted on the end adhesive tape suction member 32 corresponding thereto via the first mounting seat, and the first seat body 53 is mounted on the assembly base 10. Before the end adhesive tape suction member 32 slides to the first limit position, the first limiting member 51 mounted on the end adhesive tape suction member 32 abuts against the first seat body 53 to stop the end adhesive tape suction member 32.

When multiple first limiting assemblies 50 are provided, the first seat body 53 in each first limiting assembly 50 is integrally designed to form one first limiting seat 52, eliminating the need to separately install the first seat body 53 in each first limiting assembly 50, simplifying the assembly process.

The structure of the second limiting assembly 60 may be the same as or different from that of the first limiting assembly 50, depending on specific requirements. For example, the second limiting member 61 may include a second limiting member 61 and a second limiting seat 62, and the second limiting seat 62 is connected between the second limiting member 61 and the assembly base 10.

Each first limiting seat 52 and each second limiting seat 62 can be fixedly connected (non-detachably mounted) to the assembly base 10 or detachably mounted to the assembly base 10, the fixedly connection may be set according to requirements.

Under the action of the end limiting assembly, at least some of the end adhesive tape suction members 32 can slide relative to the central adhesive tape suction assembly 20 within a suitable range under the influence of the end limiting assembly.

In one or more embodiments of this application, the central adhesive tape suction assembly 20 includes a support member 21 and a central adhesive tape suction member 22, and the support member 21 is connected between the central adhesive tape suction member 22 and the assembly base 10; a surface of the central adhesive tape suction member 22 facing the bare cell 2000 is configured as a central adhesive tape suction end face 221, and a surface of the support member 21 facing the bare cell 2000 is configured as a support face 211; and the central adhesive tape suction end face 221 is closer to the bare cell 2000 than the support face 211.

The support member 21 may be a bar shape, a tube shape, or rail structure, and a specific form can be defined as requirements, which is not specifically limited herein.

The support member 21 extends along the second direction Y, and the central adhesive tape suction member 22 is disposed on a side face of the support member 21 arranged along a third direction Z intersecting both the first direction X and the second direction Y. An angle between the third direction Z and the first direction X can be set as an acute angle, a right angle, or an obtuse angle depending on requirements. The following embodiments take the third direction Z being perpendicular to both the first direction X and the second direction Y, with the third direction Z being another horizontal direction different from the second direction Y in FIG. 1, as an example.

In this embodiment, since the central adhesive tape suction end face 221 is closer to the bare cell 2000 than the support face 211, during the process of the central adhesive tape suction member 22 pressing the adhesive tape 3000 onto the first surface 2100 of the bare cell 2000, the support face 211 does not contact the first surface 2100 of the bare cell 2000, thereby reducing the risk of decarbonization of the bare cell 2000 caused by pressing against the first surface 2100 of the bare cell 2000 by the support face 211.

In one or more embodiments of this application, the support member 21 is slidably disposed on the assembly base 10, and the support member 21 is configured to drive the central adhesive tape suction member 22 to retract relative to each end adhesive tape suction member 32 under an external force applied to the support face 211.

The support member 21 driving the central adhesive tape suction member 22 to retract relative to each end adhesive tape suction member 32 can be understood as the support member 21 driving the central adhesive tape suction member 22 to retract relative to each end adhesive tape suction member 32, such that the central adhesive tape suction end face 221 of the central adhesive tape suction member 22 approaches the assembly base 10 relative to the end adhesive tape suction end surface 321 of each end adhesive tape suction member 32.

For example, the support member 21 can be configured as a telescopic rod, and the support member 21 drives the central adhesive tape suction member 22 to retract through its contraction direction. Alternatively, the support member 21 can be slidably mounted on the assembly base 10, and the support member 21 drives the central adhesive tape suction member 22 to retract by sliding relative to the assembly base 10.

The external force applied to the support face 211 can be provided by manual effort, a power structure, or a mechanical structure. For example, a power structure can be provided to drive the support member 21 to slide relative to the assembly base 10, driving the central adhesive tape suction member 22 to implement retraction. Alternatively, a mechanical mechanism can be provided in an external environment where the adhesive tape attaching mechanism 100 and the bare cell 2000 are located to implement retraction of the central adhesive tape suction member 22. For example, a mechanical push rod (a type of mechanical structure) is provided in the external environment, when the external driving structure drives the adhesive tape attaching mechanism 100 to move along the second direction Y, causing the central adhesive tape suction member 22 to press the middle section 3300 of the adhesive tape 3000 against the first surface 2100 of the bare cell 2000, the mechanical push rod presses against the support member 21. As the adhesive tape attaching mechanism 100 continues to move and performs adhesive tape bending and adhesive tape attachment, the support member 21, pushed by the mechanical push rod, drives the central adhesive tape suction member 22 to retract relative to each end adhesive tape suction member 32.

Specifically, before adhesive tape suction, the central adhesive tape suction end face 221 of the central adhesive tape suction member 22 is coplanar with the end adhesive tape suction end surface 321 of each end adhesive tape suction member 32, and the central adhesive tape suction member 22 and each end adhesive tape suction member 32 can jointly adsorb the adhesive tape 3000. After adhesive tape suction is completed, under the action of the external driving structure, the adhesive tape attaching mechanism 100 moves toward the bare cell 2000, and the central adhesive tape suction member 22 presses the middle section 3300 of the adhesive tape 3000 against the first surface 2100 of the bare cell 2000. Then, the external driving structure continues to drive the adhesive tape attaching mechanism 100 to move, such that the end adhesive tape suction member 32 on one side of the central adhesive tape suction assembly 20 drives the first section 3100 of the adhesive tape 3000 to bend relative to the middle section 3300 and adheres the first section 3100 to the second surface 2200 of the bare cell 2000, and the end adhesive tape suction member 32 on another side of the central adhesive tape suction assembly 20 drives the second section 3200 of the adhesive tape 3000 to bend relative to the middle section 3300 and adheres the second section 3200 to the third surface 2300 of the bare cell 2000. During this process, the support member 21, under the external force applied to the support face 211, drives the central adhesive tape suction member 22 to retract relative to each end adhesive tape suction member 32, reducing the risk of the central adhesive tape suction member 22 overpressing the first surface 2100 of the bare cell 2000. Consequently, the probability of decarbonization of the bare cell 2000 is reduced, ensuring that the bare cell 2000 maintains high quality after the adhesive tape attachment is completed.

It is worth mentioning that since the external driving mechanism continuously acts on the adhesive tape attaching mechanism 100 during this process, even if the central adhesive tape suction member 22 retracts, the middle section 3300 of the adhesive tape 3000 can still be adhered to the first surface 2100 of the bare cell 2000.

In one or more embodiments of this application, the central adhesive tape suction assembly 20 further includes an elastic member 23, and the elastic member 23 is in abutment between the assembly base 10 and the central adhesive tape suction member 22 and is configured to store elastic potential energy for driving the central adhesive tape suction member 22 to reset when the central adhesive tape suction member 22 retracts.

The resetting of the central adhesive tape suction member 22 can be understood as the central adhesive tape suction member 22 returning to a position where the central adhesive tape suction end face 221 is coplanar with the end adhesive tape suction end surface 321 of each end adhesive tape suction member 32.

The elastic member 23 can be a spring, silicone, or another highly elastic material, and a specific structure of the elastic member 23 is not limited here.

Before adhesive tape attachment, the central adhesive tape suction end face 221 of the central adhesive tape suction member 22 is coplanar with the end adhesive tape suction end surface 321 of each end adhesive tape suction member 32; at this point, the elastic member 23 can be in a naturally extended state or a compressed state, but the elastic member 23 does not store elastic potential energy for driving the central adhesive tape suction member 22 to reset. During a retraction process of the central adhesive tape suction member 22, the elastic member 23 stores elastic potential energy for driving the central adhesive tape suction member 22 to reset.

After adhesive tape attachment is completed, the adhesive tape 3000 is adhered to the bare cell 2000, and the external driving structure drives the adhesive tape attaching mechanism 100 to move along the second direction Y away from the bare cell 2000, allowing the adhesive tape attaching mechanism 100 to stop applying force to the bare cell 2000. At this point, due to the absence of a reaction force from the bare cell 2000, the central adhesive tape suction member 22 can drive the central adhesive tape suction member 22 to reset under the action of the elastic member 23, preparing for a next adhesive tape suction.

Therefore, by providing the elastic member 23, the retracted central adhesive tape suction member 22 can automatically reset, reducing the inconvenience of manual operation and enhancing usability.

In one or more embodiments of this application, the central adhesive tape suction assembly 20 further includes a blocking member, and the blocking member is coupled to the assembly base 10 and configured to prevent the central adhesive tape suction member 22 from sliding along its reset direction after the central adhesive tape suction member 22 is reset.

It can be understood that a retraction direction of the central adhesive tape suction member 22 is a sub-direction of the second direction Y, and the reset direction of the central adhesive tape suction member 22 is another sub-direction of the second direction Y.

The blocking member can be a stop rod, a stop block, or another form. The blocking member can prevent movement of the central adhesive tape suction member 22 by blocking the support member 21 or the elastic member 23; alternatively, the blocking member can directly block the central adhesive tape suction member 22, reducing the risk of the central adhesive tape suction member 22 continuing to slide along its reset direction after resetting.

In actual operation, after the central adhesive tape suction member 22 returns to a position where the central adhesive tape suction end face 221 is at the position of the end adhesive tape suction end surface 321 of each end adhesive tape suction member 32, if the elastic member 23 still has unreleased elastic potential energy, the central adhesive tape suction member 22 may continue to move and protrude beyond the end adhesive tape suction end surface 321 of each end adhesive tape suction member 32, causing the adhesive tape attaching mechanism 100 to be unable to subsequently adsorb the adhesive tape 3000 extending in a straight line smoothly.

By providing the blocking member, after the central adhesive tape suction member 22 is reset, the blocking member can prevent the central adhesive tape suction member 22 from continuing to slide along the reset direction, thereby enabling precise resetting of the central adhesive tape suction member 22 and thus allowing stable and reliable adsorbing of the adhesive tape 3000 and movement of the adhesive tape 3000.

In one or more embodiments of this application, the central adhesive tape suction assembly 20 further includes an auxiliary member 24 slidably disposed on the assembly base 10, the central adhesive tape suction member 22 is disposed on the auxiliary member 24, and the auxiliary member 24 is capable of moving relative to the assembly base 10 along the retraction direction of the central adhesive tape suction member 22 following the central adhesive tape suction member 22.

The auxiliary member 24 may be a columnar shape, a bar shape, a tube shape, or other shape, and the shape is not limited herein.

In combination with the auxiliary member 24 and the support member 21, the central adhesive tape suction member 22 can retract or reset relative to each end adhesive tape suction member 32 stably and smoothly.

In one or more embodiments of this application, the auxiliary member 24 is a tubular structure, the central adhesive tape suction member 22 has a negative pressure chamber, the central adhesive tape suction end face 221 is provided with an adsorption hole, the negative pressure chamber is in communication between the adsorption hole and an interior of the auxiliary member 24, and the auxiliary member 24 is configured to output gas from the negative pressure chamber.

Specifically, under the action of an external vacuum device, the auxiliary member 24 outputs gas from the negative pressure chamber, creating a negative pressure at the negative pressure chamber and the adsorption hole, facilitating the adsorption of the adhesive tape 3000.

It is worth mentioning that the end adhesive tape suction member 32 in this application is also a negative pressure suction member.

Therefore, in this embodiment, the auxiliary member 24 has a multifunctional capability.

Figure 5:
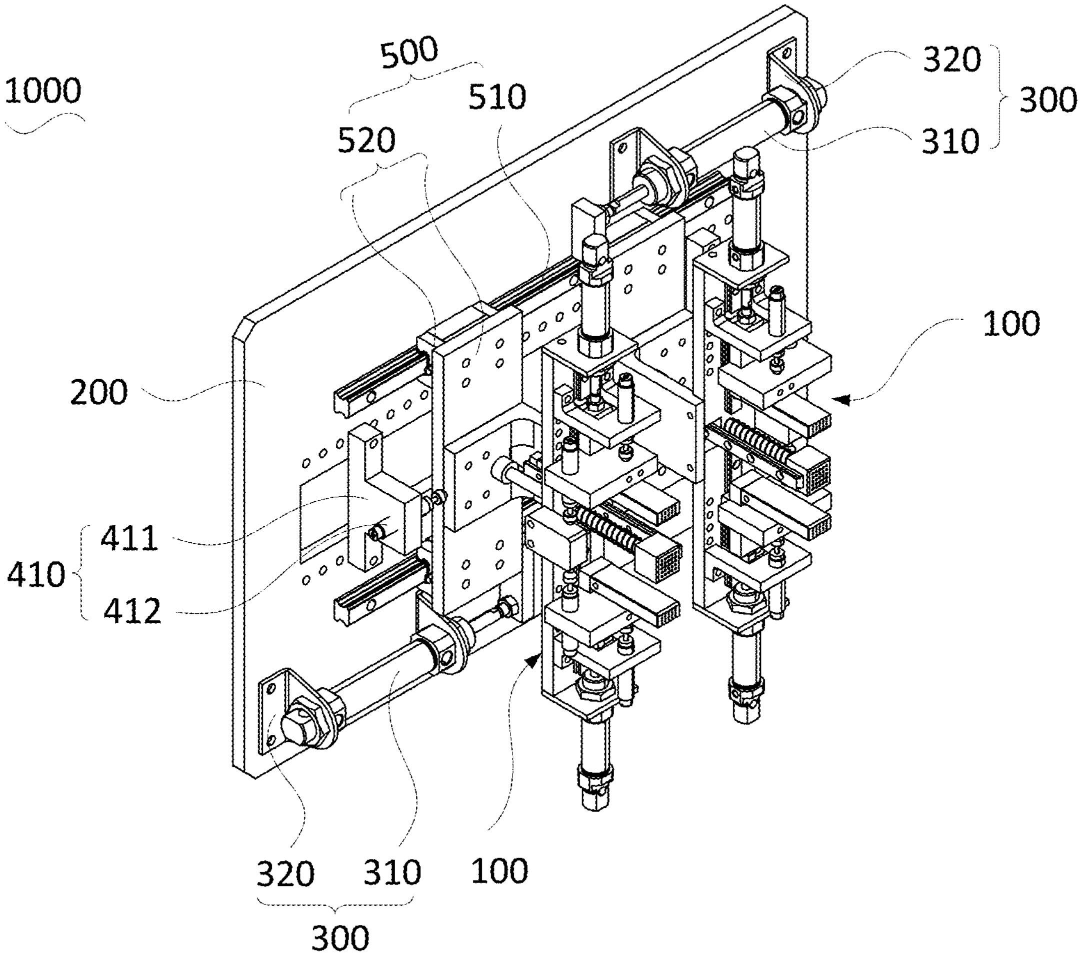
FIG. 5 is a schematic diagram of an overall structure of an adhesive tape attaching apparatus according to one or more embodiments.
Figure 6:
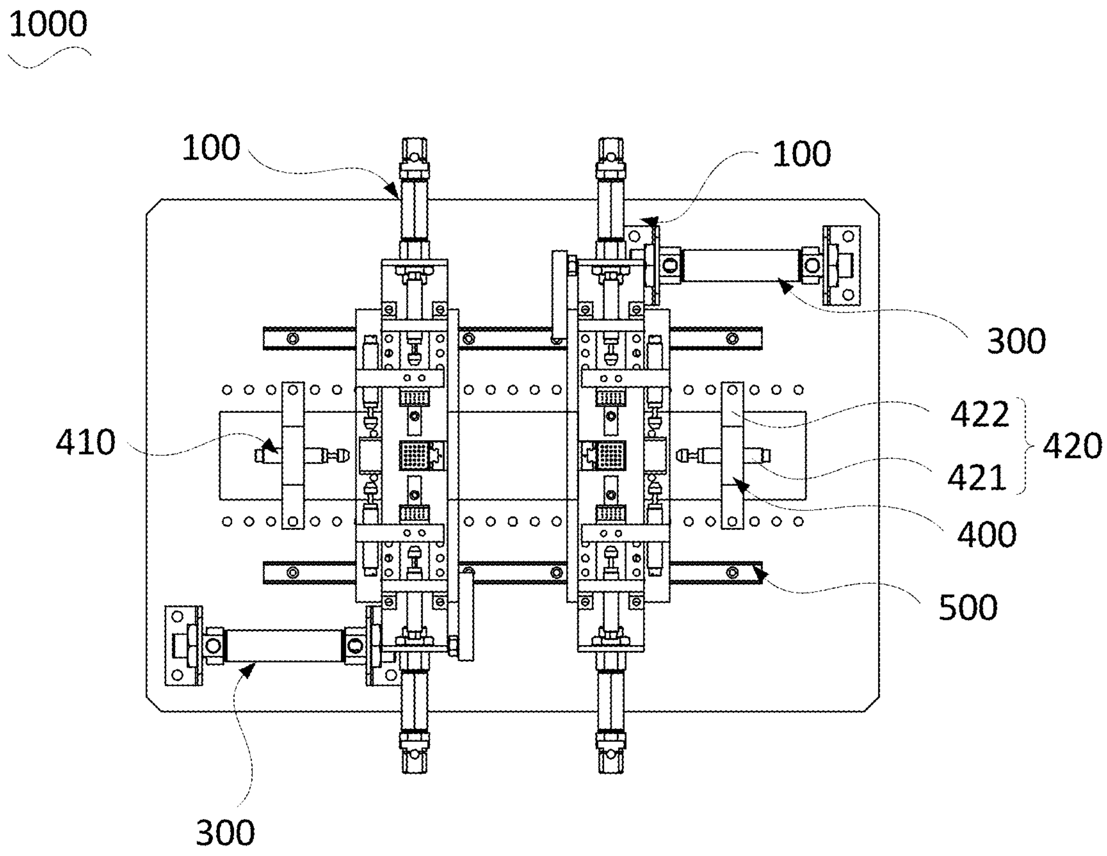
FIG. 6 is a top view of the adhesive tape attaching apparatus shown in FIG. 5.

Still referring to FIG. 1 and FIG. 2, and referring to FIG. 5 and FIG. 6; FIG. 5 is a schematic diagram of an overall structure of an adhesive tape attaching apparatus 1000 according to one or more embodiments, and FIG. 6 is a top view of the adhesive tape attaching apparatus 1000 according to one or more embodiments.

According to a second aspect, one or more embodiments of this application provide an adhesive tape attaching apparatus 1000 including the adhesive tape attaching mechanism 100 according to any one of the foregoing embodiments.

Specifically, the number of the adhesive tape attaching mechanisms 100 in the adhesive tape attaching apparatus 1000 can be set to one or more according to production capacity, and each adhesive tape attaching mechanism 100 can be used for adhesive tape attachment. For example, multiple adhesive tape attaching mechanisms 100 can be provided, all adhesive tape attaching mechanisms 100 may attach adhesive tape to a surface of the same bare cell 2000; alternatively, different adhesive tape attaching mechanisms 100 may also attach adhesive tape to surfaces of different bare cells 2000; alternatively, all adhesive tape attaching mechanisms 100 can be arranged in pairs, with adhesive tape attaching mechanisms 100 in the same pair attaching adhesive tape to a surface of the same bare cell 2000 and adhesive tape attaching mechanisms 100 in different pairs attaching adhesive tape to surfaces of different bare cells 2000. For ease of description, the following embodiments take the adhesive tape attaching mechanisms 100 being one pair and all used to attach adhesive tape to the same bare cell 2000 as an example. After adhesive tape attachment is completed, the bare cell 2000 has two U-shaped adhesive tapes 3000.

The adhesive tape attaching apparatus 1000 uses the adhesive tape attaching mechanism 100 according to any one of the foregoing embodiments for adhesive tape attachment, offering better reliability of adhesive tape attachment.

In one or more embodiments of this application, the adhesive tape attaching apparatus 1000 further includes a carrier body 200 and a translation mechanism 300, at least one adhesive tape attaching mechanism 100 is provided, the translation mechanism 300 and all adhesive tape attaching mechanisms 100 are disposed on the carrier body 200, and the translation mechanism 300 is in transmission connection with at least one adhesive tape attaching mechanism 100 and configured to drive the adhesive tape attaching mechanism 100 connected thereto to slide in a direction intersecting both an arrangement direction of the end adhesive tape suction assemblies 30 and an adhesive tape attachment direction of the central adhesive tape suction assembly 20.

The arrangement direction of the end adhesive tape suction assemblies 30 is the foregoing first direction X, and the adhesive tape attachment direction of the central adhesive tape suction assembly 20 is the same as the reset direction of the central adhesive tape suction member 22; a direction intersecting both the arrangement direction of the end adhesive tape suction assemblies 30 and the adhesive tape attachment direction of the central adhesive tape suction assembly 20 is defined as a third direction Z, where an angle between the third direction Z and the first direction X, and an angle between the third direction Z and the second direction Y, can both be set as an acute angle, a right angle, or an obtuse angle depending on requirements. For ease of description, the following embodiments take the third direction Z being perpendicular to both the first direction X and the second direction Y, with the third direction Z being another horizontal direction in the state of the adhesive tape attaching mechanism 100 shown in FIG. 1, as an example.

The translation mechanism 300 being in transmission connection with at least one adhesive tape attaching mechanism 100 can be understood as the translation mechanism 300 being in transmission connection with some of the adhesive tape attaching mechanisms 100 or with each adhesive tape attaching mechanism 100. The translation mechanism 300 can drive each adhesive tape attaching mechanism 100 in transmission connection therewith to slide along the third direction Z, thereby adjusting a position of each adhesive tape attaching mechanism 100 in transmission connection therewith in the third direction Z.

Taking each adhesive tape attaching mechanism 100 being used to attach adhesive tape to different bare cells 2000 as an example, the translation mechanism 300 drives each adhesive tape attaching mechanism 100 in transmission connection therewith to slide along the third direction Z, allowing each sliding adhesive tape attaching mechanism 100 to align with the workpiece to be adhered requiring adhesive tape attachment in the second direction Y, facilitating subsequent adhesive tape attachment.

Taking the adhesive tape attaching mechanisms 100 being arranged in pairs, with the two adhesive tape attaching mechanisms 100 in each pair used to attach adhesive tape to the same bare cell 2000 as an example, the translation mechanism 300 drives at least one adhesive tape attaching mechanism 100 in each pair to slide along the third direction Z, adjusting a distance between the two adhesive tape attaching mechanisms 100 in the same pair in the third direction Z, thereby accommodating adhesive tape attachment requirements for bare cells 2000 of different widths.

For ease of description, the following embodiments take two adhesive tape attaching mechanisms 100 forming a pair, with the translation mechanism 300 in transmission connection with two adhesive tape attaching mechanisms 100, as an example.

The translation mechanism 300 includes at least one pair of translation assemblies, and different translation assemblies are in transmission connection with different adhesive tape attaching mechanisms 100.

The translation assembly may include only a single translation driving member 310, and the translation driving member 310 may be, for example, a linear driving member such as a cylinder or hydraulic cylinder. The translation driving member 310 is in transmission connection with the assembly base 10 of the adhesive tape attaching mechanism 100 and drives the assembly base 10 to drive the entire adhesive tape attaching mechanism 100 to slide.

The translation assembly may also include the translation driving member 310 and a translation mounting seat 320, and the translation driving member 310 is fixedly connected or detachably connected to the carrier body 200 via the translation mounting seat 320. The translation driving member 310 can all be linear driving members such as cylinders or hydraulic cylinders.

To facilitate sliding of the adhesive tape attaching mechanism 100 along the third direction Z, a translation sliding mechanism 500 is further disposed on the carrier body 200. The translation sliding mechanism 500 can include a translation slide rail 510 and multiple translation sliders 520 slidably disposed on the translation slide rail 510, the translation slide rail 510 extends along the third direction Z, and different translation sliders 520 are provided with different adhesive tape attaching mechanisms 100. Each translation driving member 310 drives each adhesive tape attaching mechanism 100 to slide along the third direction Z via each translation slider, enhancing smoothness and stability of sliding of each adhesive tape attaching mechanism 100.

In this embodiment, by providing the translation mechanism 300, a position of the adhesive tape attaching mechanism 100 in transmission connection with the translation mechanism 300 can be adjusted in the third direction Z, accommodating adhesive tape attachment requirements at different positions or for different widths, offering higher compatibility.

In one or more embodiments of this application, the adhesive tape attaching apparatus 1000 further includes an adhesive tape attachment limiting mechanism 400, and the adhesive tape attachment limiting mechanism 400 is disposed on the carrier body 200 and configured to limit a unidirectional or bidirectional sliding distance of at least one adhesive tape attaching mechanism 100.

Specifically, the third direction Z includes a first sub-direction Z1 and a second sub-direction Z2; a farthest position to which the adhesive tape attaching mechanism 100 slides from an initial position along the first sub-direction Z1 is defined as a third limit position, and a farthest position to which the adhesive tape attaching mechanism 100 slides from the initial position along the second sub-direction Z2 is defined as a fourth limit position, where the third limit position and the fourth limit position are both disposed on the carrier body 200, the third limit position of each adhesive tape attaching mechanism 100 in transmission connection with the translation mechanism 300 is different, and the fourth limit position of each adhesive tape attaching mechanism 100 in transmission connection with the translation mechanism 300 is also different.

The unidirectional sliding distance refers to a distance between the initial position and the third limit position, and the bidirectional sliding distance refers to a distance between the third limit position and the fourth limit position. The initial position refers to the position of the adhesive tape attaching mechanism 100 when the adhesive tape attaching apparatus 1000 is assembled and before a first adhesive tape attachment is performed, located between the third limit position and the fourth limit position.

When the adhesive tape attachment limiting mechanism 400 is located at any one third limit position, the adhesive tape attaching mechanism 100 having this third limit position abuts against the adhesive tape attachment limiting mechanism 400 and stops sliding when moving to this third limit position. When the adhesive tape attachment limiting mechanism 400 is located at any one fourth limit position, the adhesive tape attaching mechanism 100 having this fourth limit position abuts against the adhesive tape attachment limiting mechanism 400 and stops sliding when moving to this fourth limit position.

For example, the adhesive tape attachment limiting mechanism 400 can be disposed only at the third limit position or the fourth limit position of one of the adhesive tape attaching mechanisms 100; alternatively the adhesive tape attachment limiting mechanism 400 can be disposed simultaneously at the third limit position and the fourth limit position of one of the end adhesive tape suction members 32; alternatively, the adhesive tape attachment limiting mechanism 400 can be disposed simultaneously at the third limit position of each adhesive tape attaching mechanism 100 and the fourth limit position of each end adhesive tape suction member 32, and the like. The position where the adhesive tape attachment limiting mechanism 400 is disposed can be set according to requirements.

A portion of the adhesive tape attachment limiting mechanism 400 located at the third limit position is defined as a third limiting assembly 410, and a portion of the adhesive tape attachment limiting mechanism 400 located at the fourth limit position is defined as a fourth limiting assembly 420. When the adhesive tape attachment limiting mechanism 400 is disposed only at one third limit position, the adhesive tape attachment limiting mechanism 400 consists only of one third limiting assembly 410. When the adhesive tape attachment limiting mechanism 400 is disposed only at one third limit position and one fourth limit position, the adhesive tape attachment limiting mechanism 400 consists of one third limiting assembly 410 and one fourth limiting assembly 420. When the adhesive tape attachment limiting mechanism 400 is disposed at each third limit position and each fourth limit position, the adhesive tape attachment limiting mechanism 400 consists of each third limiting assembly 410 located at each third limit position and each fourth limiting assembly 420 located at each fourth limit position.

The third limiting assembly 410 can include a third limiting member 411 and a third limiting seat 412, and the third limiting seat 412 is connected between the third limiting member 411 and the assembly base 10. The fourth limiting assembly 420 can include a fourth limiting member 421 and a fourth limiting seat 422, and the fourth limiting seat 422 is connected between the fourth limiting member 421 and the assembly base 10.

Certainly, specific forms of the third limiting assembly 410 and the fourth limiting assembly 420 are not limited to the foregoing types, and other forms are possible, provided that the third limiting assembly 410 and the fourth limiting assembly 420 can limit sliding of the adhesive tape attaching mechanism 100.

Under an action of the adhesive tape attachment limiting mechanism 400, at least some of the adhesive tape attaching mechanisms 100 can slide within a suitable range.

Still referring to FIG. 5 and FIG. 6; according to a third aspect, in one or more embodiments of this application, this application further provides a battery production line, including the adhesive tape attaching apparatus 1000 according to any one of the foregoing embodiments.

After winding or stacking of the bare cell 2000 is completed, the adhesive tape attaching apparatus 1000 performs U-shaped adhesive tape attachment on the bare cell 2000, enabling compaction of the bare cell 2000.

Specifically, the battery production line may include, but is not limited to, the adhesive tape attaching apparatus 1000. For example, the battery production line further includes a machine body and the foregoing external driving structure, where the external driving structure, the adhesive tape attaching apparatus 1000, and the bare cell 2000 are all disposed on the machine body, the adhesive tape attaching apparatus 1000 and the bare cell 2000 are arranged along the second direction Y, and the external driving structure is configured to drive the adhesive tape attaching apparatus 1000 to slide relative to the machine body along the second direction Y to attach adhesive tape to the bare cell 2000. In addition, the machine body can be configured to form the foregoing mechanical push rod to push the central adhesive tape suction member 22 to retract relative to each end adhesive tape suction member 32.

The external driving structure is a conventional technical means in the art, and thus a specific structure of the external driving structure is not limited. For example, the external driving structure can be a telescopic cylinder, a three-axis robotic arm, and the like.

Regarding adhesive tape suction and adhesive tape attachment by the adhesive tape attaching apparatus 1000, for example, an adhesive tape suction position and an adhesive tape attachment position are provided on the machine body, the adhesive tape suction position and the adhesive tape attachment position are spaced apart along the third direction Z, the bare cell 2000 is located at the adhesive tape attachment position, the adhesive tape 3000 is located at the adhesive tape suction position, and the adhesive tape attaching mechanism 100, under the action of the translation mechanism 300, moves along the third direction Z to a position aligned with the adhesive tape suction position and performs adhesive tape suction; after adhesive tape suction is completed, the adhesive tape attaching mechanism 100 moves along the third direction Z to a position aligned with the adhesive tape attachment position to perform adhesive tape attachment.

In one or more embodiments of this application, referring to FIG. 1 to FIG. 6, this application provides the adhesive tape attaching mechanism 100, including the assembly base 10, the central adhesive tape suction assembly 20, the end adhesive tape suction assemblies 30, and the end sliding assembly 40. The central adhesive tape suction assembly 20 is disposed on the assembly base 10 and capable of adsorbing and attaching the adhesive tape 3000 to the first surface 2100 of the workpiece to be adhered, the end adhesive tape suction assemblies 30 are disposed on the assembly base 10 and arranged on two opposite sides of the central adhesive tape suction assembly 20, and each end adhesive tape suction assembly 30 includes the end driving member 31 and the end adhesive tape suction member 32 in transmission connection with the end driving member 31. The end sliding assembly 40 is disposed on the assembly base 10. Each end adhesive tape suction member 32 is configured to be driven by the end driving member 31 connected thereto, guided by the end sliding assembly 40 to slide toward the central adhesive tape suction assembly 20 for closing or opening, and is capable of adsorbing, bending, and attaching the adhesive tape 3000 to the second surface 2200 and the third surface 2300 of the workpiece to be adhered, respectively, with the second surface 2200 and the third surface 2300 both arranged adjacent to the first surface 2100, and the second surface 2200 arranged opposite to the third surface 2300.

In such an adhesive tape attaching mechanism 100, the force provided by each end driving member 31 to the end adhesive tape suction member 32 connected to thereto is controllable and exhibits minimal variation over extended use time. Therefore, the pressing force applied by each end adhesive tape suction member 32 during the process of pressing the adhesive tape 3000 onto the surface of the bare cell 2000 remains relatively stable. Consequently, the bare cell 2000 can be compacted under the action of the adhesive tape 3000, improving quality. Furthermore, since the end adhesive tape suction members 32 on two sides of the central adhesive tape suction assembly 20 can close or open, the adhesive tape attaching mechanism can accommodate products of different thicknesses, offering better adhesive tape attachment compatibility.

Technical features in the foregoing embodiments may be combined in any way. For brevity of description, possible combinations of the technical features in the foregoing embodiments are not described all. However, as long as there is no contradiction among combinations of these technical features, all the combinations should be considered within a range recorded in this specification.

The foregoing embodiments only represent several implementations of this application, and descriptions thereof are specific and detailed, but should not be construed as a limitation on the scope of this application. It should be noted that those of ordinary skill in the art can further make several modifications and improvements without departing from the concept of this application, and these modifications and improvements also fall within the protection scope of this application.

The invention claimed is:

1. An adhesive tape attaching mechanism, comprising:

an assembly base;

a central adhesive tape suction assembly, disposed on the assembly base and capable of adsorbing and attaching an adhesive tape to a first surface of a workpiece to be adhered;

end adhesive tape suction assemblies, disposed on the assembly base and arranged on two opposite sides of the central adhesive tape suction assembly, wherein each of the end adhesive tape suction assemblies comprises an end driving member and an end adhesive tape suction member in transmission connection with the end driving member; and an end sliding assembly, disposed on the assembly base; wherein each of the end adhesive tape suction members is configured to be driven by the end driving member connected thereto, guided by the end sliding assembly to slide toward the central adhesive tape suction assembly for adjusting a distance between the end adhesive tape suction members to match a thickness of the workpiece to be adhered, and is capable of adsorbing, bending, and attaching the adhesive tape to a second surface and a third surface of the workpiece to be adhered, respectively, wherein the second surface and the third surface are both arranged adjacent to the first surface, and the second surface is arranged opposite to the third surface, the central adhesive tape suction assembly comprises a support member, a central adhesive tape suction member, and an auxiliary member, the support member being connected between the central adhesive tape suction member and the assembly base, a surface of the central adhesive tape suction member facing the workpiece to be adhered is configured as a central adhesive tape suction end face, and a surface of the support member facing the workpiece to be adhered is configured as a support face, the central adhesive tape suction end face is closer to the workpiece to be adhered than the support face, the support member is slidably disposed on the assembly base, and the support member is configured to drive the central adhesive tape suction member to retract relative to each of the end adhesive tape suction members under an external force applied to the support face, the auxiliary member slidably disposed on the assembly base, and the central adhesive tape suction member being disposed on the auxiliary member, and the auxiliary member being configured to be movable relative to the assembly base along a retraction direction of the central adhesive tape suction member following the central adhesive tape suction member.

2. The adhesive tape attaching mechanism according to claim 1, wherein each of the end adhesive tape suction members is configured to have a first limit position when moving toward the central adhesive tape suction assembly, each of the end adhesive tape suction members is configured to have a second limit position when moving away from the central adhesive tape suction assembly, and each of the first limit positions is located between the second limit position corresponding to the respective first limit position and the central adhesive tape suction assembly; and the adhesive tape attaching mechanism further comprises an end limiting assembly, and the end limiting assembly is disposed in at least one of the first limit positions and/or at least one of the second limit positions.

3. The adhesive tape attaching mechanism according to claim 1, wherein the central adhesive tape suction assembly further comprises an elastic member, the elastic member being in abutment between the assembly base and the central adhesive tape suction member, and being configured to store elastic potential energy for driving the central adhesive tape suction member to reset when the central adhesive tape suction member retracts.

4. The adhesive tape attaching mechanism according to claim 3, wherein the central adhesive tape suction assembly further comprises a blocking member, the blocking member being coupled to the assembly base and configured to prevent the central adhesive tape suction member from sliding along a reset direction of the central adhesive tape suction member after the central adhesive tape suction member is reset.

5. The adhesive tape attaching mechanism according to claim 1, wherein the auxiliary member is a tubular structure, the central adhesive tape suction member has a negative pressure chamber, the central adhesive tape suction end face is provided with an adsorption hole, the negative pressure chamber is in communication between the adsorption hole and an interior of the auxiliary member, and the auxiliary member is configured to output gas from the negative pressure chamber.

6. An adhesive tape attaching apparatus, comprising:

a carrier body and a translation mechanism;

at least one adhesive tape attaching mechanism disposed on the carrier body, the adhesive tape attaching mechanism including an assembly base;

a central adhesive tape suction assembly, disposed on the assembly base and capable of adsorbing and attaching an adhesive tape to a first surface of a workpiece to be adhered;

end adhesive tape suction assemblies, disposed on the assembly base and arranged on two opposite sides of the central adhesive tape suction assembly, wherein each of the end adhesive tape suction assemblies comprises an end driving member and an end adhesive tape suction member in transmission connection with the end driving member; and an end sliding assembly, disposed on the assembly base, wherein each of the end adhesive tape suction members is configured to be driven by the end driving member connected thereto, guided by the end sliding assembly to slide toward the central adhesive tape suction assembly for adjusting a distance between the end adhesive tape suction members to match a thickness of the workpiece to be adhered, and is capable of adsorbing, bending, and attaching the adhesive tape to a second surface and a third surface of the workpiece to be adhered, respectively, wherein the second surface and the third surface are both arranged adjacent to the first surface, and the second surface is arranged opposite to the third surface, the translation mechanism and all the adhesive tape attaching mechanisms are disposed on the carrier body, and the translation mechanism is in transmission connection with the at least one adhesive tape attaching mechanism and configured to drive the adhesive tape attaching mechanism connected thereto to slide in a direction intersecting both an arrangement direction of the end adhesive tape suction assemblies and an adhesive tape attachment direction of the central adhesive tape suction assembly.

7. The adhesive tape attaching apparatus according to claim 6, wherein the adhesive tape attaching apparatus further comprises an adhesive tape attachment limiting mechanism, the adhesive tape attachment limiting mechanism being disposed on the carrier body and configured to limit a unidirectional or bidirectional sliding distance of the at least one adhesive tape attaching mechanism.

8. A battery production line, comprising an adhesive tape attaching apparatus comprising an adhesive tape attaching mechanism, the adhesive tape attaching mechanism comprising:

an assembly base;

a central adhesive tape suction assembly, disposed on the assembly base and capable of adsorbing and attaching an adhesive tape to a first surface of a workpiece to be adhered;

end adhesive tape suction assemblies, disposed on the assembly base and arranged on two opposite sides of the central adhesive tape suction assembly, wherein each of the end adhesive tape suction assemblies comprises an end driving member and an end adhesive tape suction member in transmission connection with the end driving member; and an end sliding assembly, disposed on the assembly base, wherein each of the end adhesive tape suction members is configured to be driven by the end driving member connected thereto, guided by the end sliding assembly to slide toward the central adhesive tape suction assembly for adjusting a distance between the end adhesive tape suction members to match a thickness of the workpiece to be adhered, and is capable of adsorbing, bending, and attaching the adhesive tape to a second surface and a third surface of the workpiece to be adhered, respectively, wherein the second surface and the third surface are both arranged adjacent to the first surface, and the second surface is arranged opposite to the third surface, the central adhesive tape suction assembly includes a support member, a central adhesive tape suction member, and an elastic member, the support member being connected between the central adhesive tape suction member and the assembly base, the elastic member being in abutment between the assembly base and the central adhesive tape suction member, a surface of the central adhesive tape suction member facing the workpiece to be adhered is configured as a central adhesive tape suction end face, and a surface of the support member facing the workpiece to be adhered is configured as a support face, wherein the central adhesive tape suction end face is closer to the workpiece to be adhered than the support face, the support member is slidably disposed on the assembly base, and the support member is configured to drive the central adhesive tape suction member to retract relative to each of the end adhesive tape suction members under an external force applied to the support face, and the elastic member being configured to store elastic potential energy for driving the central adhesive tape suction member to reset when the central adhesive tape suction member retracts.

9. The battery production line including the adhesive tape attaching apparatus according to claim 8, wherein the adhesive tape attaching apparatus further comprises a carrier body and a translation mechanism; at least one adhesive tape attaching mechanism is provided; the translation mechanism and all the adhesive tape attaching mechanisms are disposed on the carrier body; and the translation mechanism is in transmission connection with the at least one adhesive tape attaching mechanism and configured to drive the adhesive tape attaching mechanism connected thereto to slide in a direction intersecting both an arrangement direction of the end adhesive tape suction assemblies and an adhesive tape attachment direction of the central adhesive tape suction assembly.

10. The battery production line including the adhesive tape attaching apparatus according to claim 9, wherein the adhesive tape attaching apparatus further comprises an adhesive tape attachment limiting mechanism, the adhesive tape attachment limiting mechanism being disposed on the carrier body and configured to limit a unidirectional or bidirectional sliding distance of the at least one adhesive tape attaching mechanism.

11. The adhesive tape attaching mechanism according to claim 1, wherein:

the each of the end adhesive tape suction assemblies comprises the end driving member and the end adhesive tape suction member in transmission connection with the end driving member, the end driving member providing a controllable force, and the each of the end adhesive tape suction members is configured to be driven by the end driving member connected thereto, guided by the end sliding assembly to slide toward the central adhesive tape suction assembly to clamp the workpiece with a pressing force.

12. The adhesive tape attaching apparatus according to claim 6, wherein:

the each of the end adhesive tape suction assemblies comprises the end driving member and the end adhesive tape suction member in transmission connection with the end driving member, the end driving member providing a controllable force, and the each of the end adhesive tape suction members is configured to be driven by the end driving member connected thereto, guided by the end sliding assembly to slide toward the central adhesive tape suction assembly to clamp the workpiece with a pressing force.

13. The battery production line including the adhesive tape attaching mechanism according to claim 8, wherein:

the each of the end adhesive tape suction assemblies comprises the end driving member and the end adhesive tape suction member in transmission connection with the end driving member, the end driving member providing a controllable force, and the each of the end adhesive tape suction members is configured to be driven by the end driving member connected thereto, guided by the end sliding assembly to slide toward the central adhesive tape suction assembly to clamp the workpiece with a pressing force.

* * * * *